US008917415B2

(12) United States Patent
Scrafford et al.

(10) Patent No.: US 8,917,415 B2
(45) Date of Patent: Dec. 23, 2014

(54) METHOD AND APPARATUS FOR AUTOMATICALLY SCALING PRINT JOBS IN AN IMAGE PRODUCTION DEVICE

(75) Inventors: Matthew O. Scrafford, Fairport, NY (US); Jason C. Tsongas, Rochester, NY (US); Lynn M. Bell, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 192 days.

(21) Appl. No.: 13/114,196

(22) Filed: May 24, 2011

(65) Prior Publication Data

US 2012/0300225 A1 Nov. 29, 2012

(51) Int. Cl.
  *G06K 15/02* (2006.01)
  *G06F 3/12* (2006.01)
  *G06K 15/00* (2006.01)

(52) U.S. Cl.
  CPC .......... *G06K 15/1823* (2013.01); *G06K 15/186* (2013.01); *G06K 15/4065* (2013.01)
  USPC ............................ 358/1.2; 358/1.13; 358/1.18

(58) Field of Classification Search
  CPC ........................... G06F 17/211; G06K 15/4065
  See application file for complete search history.

(56) References Cited

U.S. PATENT DOCUMENTS

| 5,613,045 A * | 3/1997 | Morimoto et al. ............. 358/1.2 |
| 6,075,615 A | 6/2000 | Nakamura |
| 6,285,842 B1 * | 9/2001 | Katamoto et al. ............... 399/81 |
| 7,692,806 B2 * | 4/2010 | Ohshima et al. ............. 358/1.15 |
| 2003/0041102 A1 * | 2/2003 | Simpson et al. ............... 709/203 |
| 2005/0111894 A1 * | 5/2005 | Hosoi ........................... 399/371 |
| 2005/0157344 A1 * | 7/2005 | Nagashima ................. 358/1.18 |
| 2006/0250621 A1 * | 11/2006 | Cochran et al. ................ 358/1.2 |
| 2008/0316549 A1 * | 12/2008 | Bush et al. .................... 358/488 |
| 2009/0021772 A1 * | 1/2009 | Salgado et al. ............. 358/1.15 |

* cited by examiner

*Primary Examiner* — Vincent Rudolph
(74) *Attorney, Agent, or Firm* — Ronald E. Prass, Jr.; Prass LLP (57) ABSTRACT

A method for automatically scaling print jobs in an image production device network may include receiving a request to print a print job using a particular media sheet size a particular image production device, determining a size of media in one or more media trays in the particular image production device, determining if the size of the media in the requested print job matches the determined media size in one of the one or more media trays, wherein if it is determined that the size of the media in the requested print job does not match the determined media size in one of the one or more media trays, determining the media size in the one or more media trays closest to the print job media sheet size, scaling the requested print job to the determined closest media size, and printing the requested print job on the determined closest media sheet size from one of the one or more media trays.

12 Claims, 5 Drawing Sheets

METHOD AND APPARATUS FOR AUTOMATICALLY SCALING PRINT JOBS IN AN IMAGE PRODUCTION DEVICE

BACKGROUND

Disclosed herein is a method for automatically scaling print jobs in an image production device network, as well as corresponding apparatus and computer-readable medium.

When a user submits a document to an image production device using an automated system like a "Mobile Print" system, the user is not able to adjust the document to fit the media that is loaded in the image production device. When a user submits a document that does not match the media loaded in the image production device (such as letter, when A4 is the only paper in the an image production device) the print job will be held at the image production device until correct resources are loaded. This issue slows down user productivity and causes dissatisfaction with the image production device's capabilities.

SUMMARY

A method and apparatus for automatically scaling print jobs in an image production device network is disclosed. The method may include receiving a request to print a print job at a particular image production device using a particular media sheet size in the particular image production device, determining a size of media in one or more media trays, determining if the size of the media in the requested print job matches the determined media size in one of the one or more media trays, wherein if it is determined that the size of the media in the requested print job does not match the determined media size in one of the one or more media trays, determining the media size in the one or more media trays closest to the print job media sheet size, scaling the requested print job to the determined closest media size, and printing the requested print job on the determined closest media sheet size from one of the one or more media trays.

DETAILED DESCRIPTION

Aspects of the embodiments disclosed herein relate to a method for automatically scaling print jobs in an image production device network, as well as corresponding apparatus and computer-readable medium.

The disclosed embodiments may include a method for automatically scaling print jobs in an image production device network. The method may include receiving a request to print a print job at a particular image production device using a particular media sheet size, determining a size of media in one or more media trays in the particular image production device, determining if the size of the media in the requested print job matches the determined media size in one of the one or more media trays, wherein if it is determined that the size of the media in the requested print job does not match the determined media size in one of the one or more media trays, determining the media size in the one or more media trays closest to the print job media sheet size, scaling the requested print job to the determined closest media size, and printing the requested print job on the determined closest media sheet size from one of the one or more media trays.

The disclosed embodiments may further include an image production device management unit in an image production device network that may include one or more image production devices each having one or more media trays each containing media sheets of a particular size and an image production section that prints requested print jobs, and an automatic print job scaling unit that receives a request to print a print job at a particular image production device using a particular media sheet size, determines a size of media in the one or more media trays in the particular image production device, determines if the size of the media in the requested print job matches the determined media size in one of the one or more media trays, wherein if the automatic print job scaling unit determines that the size of the media in the requested print job does not match the determined media size in one of the one or more media trays, the automatic print job scaling unit determines the media size in the one or more media trays closest to the print job media sheet size, scales the requested print job to the determined closest media size, and prints the requested print job on the determined closest media sheet size from one of the one or more media trays using the image production section.

The disclosed embodiments may include a computer-readable medium storing instructions for controlling a computing device for automatically scaling print jobs in an image production device network. The instructions may include receiving a request to print a print job at a particular image production device using a particular media sheet size, determining a size of media in one or more media trays in the particular image production device, determining if the size of the media in the requested print job matches the determined media size in one of the one or more media trays, wherein if it is determined that the size of the media in the requested print job does not match the determined media size in one of the one or more media trays, determining the media size in the one or more media trays closest to the print job media sheet size, scaling the requested print job to the determined closest media size, and printing the requested print job on the determined closest media sheet size from one of the one or more media trays.

The disclosed embodiments may concern automatically scaling of print jobs in an image production device network. For example, as the user submits a print job to an image production device management unit to print a print job at a particular image production device. An automatic print job scaling unit may then detect the media currently loaded in the particular image production device and if the print job document is not the same size as the loaded media, the automatic print job scaling unit may automatically change the media size to match media contained in the media trays of the image production device. The automatic print job scaling unit may select the best fit media size and may scale the document up or down based on what is in the media trays of the image production device. This process differs from existing software because it converts the print job to the media size actually loaded in the image production device at the time of the print job request by querying the image production device.

When a user submits a print job to an image production device using an automated system such as "mobile print", the user does not have the ability to change the size of the document to match the media size loaded in the image production device. The process of the disclosed embodiments may automatically change the size of the document to match the media currently loaded in the image production device so the user does not have to look for resources to load into the image production device. This process differs from existing software because it converts to the media size actually loaded in the image production device at the time of the print job request by querying the image production device.

Once example of this process may be is a person from the U.S. going to Europe on a business trip and once they arrive, they realize that they need to print a presentation. They may use their smart phone to send the document to "mobile print" and once the document is released to the image production device, the document may not print as the print job gets held for resources because the media tray(s) in the image production device only have A4 loaded.

In the disclosed embodiments, once a print job is submitted to image production device management unit to print a print job at a particular image production device, the automatic prize job scaling unit may determine the current media size loaded in each media tray. As the image production device management unit processes the print job, the automatic prize job scaling unit may determine if the document size fits one of the media sizes loaded in the image production device and if it does, the automatic prize job scaling unit may release the job. If the document does not match any of the media sizes, the automatic prize job scaling unit may look for the closest match that is smaller and larger than the original document size and pick the one that is least different from the original size. Once it has chosen the closest match, the automatic prize job scaling unit may determine if the match is within acceptable scaling (this process may be configurable by the system administrator), if so, the automatic prize job scaling unit may change the document size and then release it to the image production device. If the closest matching media size is not within the acceptable scaling, the automatic prize job scaling unit may release the document at the original size.

The disclosed embodiments may include:

Document may be automatically converted to the best fit media size, based on a query of the actually loaded and available media currently loaded in the image production device.

Benefits of the disclosed embodiments may include:

Reduce the end users time trying to find media to load into the image production device.

Reduce waste by eliminating poorly formatted output.

Increase customer satisfaction by having print jobs print without the customer's intervention.

Figure 1:
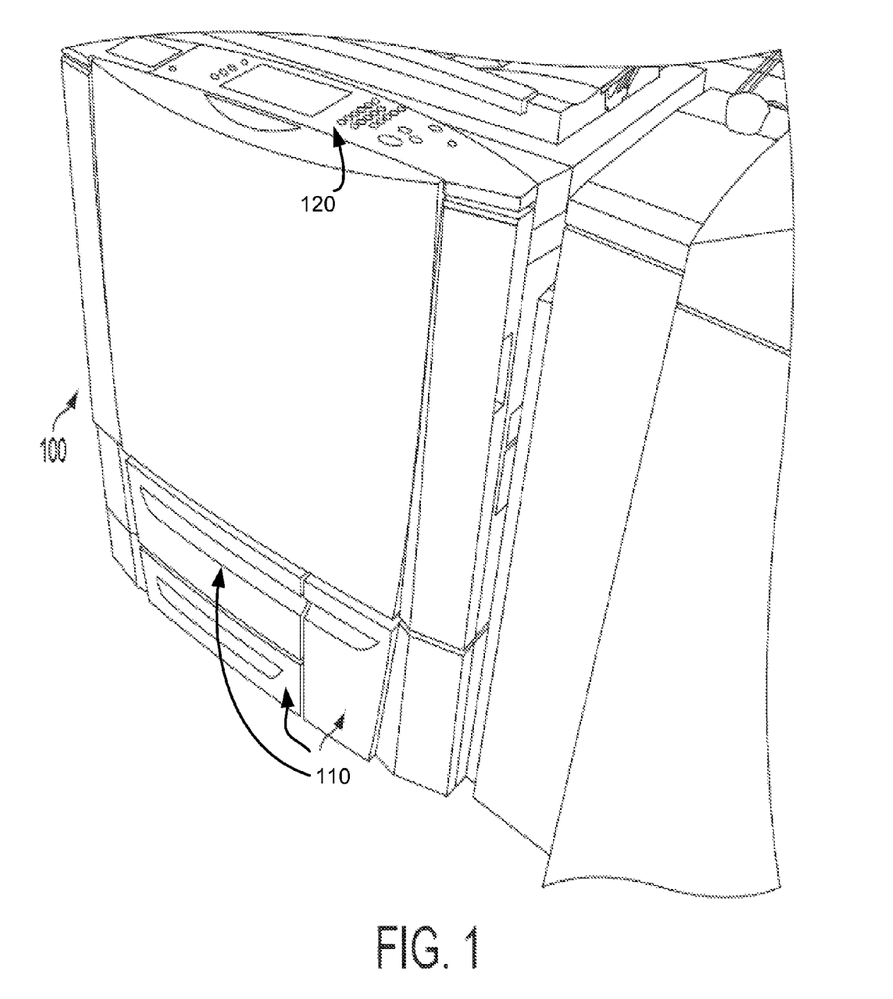
FIG. 1 is an exemplary diagram of an image production device in accordance with one possible embodiment of the disclosure.

FIG. 1 is an exemplary diagram of an image production device 100 in accordance with one possible embodiment of the disclosure. The image production device 100 may be any device that may be capable of making image production documents (e.g., printed documents, copies, etc.) including a copier, a printer, a facsimile device, and a multi-function device (MFD), for example.

The image production device 100 may include one or more media trays 110 and a local user interface 120. The one or more media trays 110 may each contain media of a particular media sheet size. The one or more media trays 110 may be opened by a user so that media may be checked, replaced, or to investigate a media misfeed or jam, for example.

The user interface 120 may contain one or more display screens (which may be a touchscreen or simply a display), and a number of buttons, knobs, switches, etc. to be used by a user to control image production device 100 operations. The one or more display screen may also display warnings, alerts, instructions, and information to a user. While the user interface 120 may accept user inputs, another source of image data and instructions may include inputs from any number of computers to which the printer is connected via a network.

Figure 2:
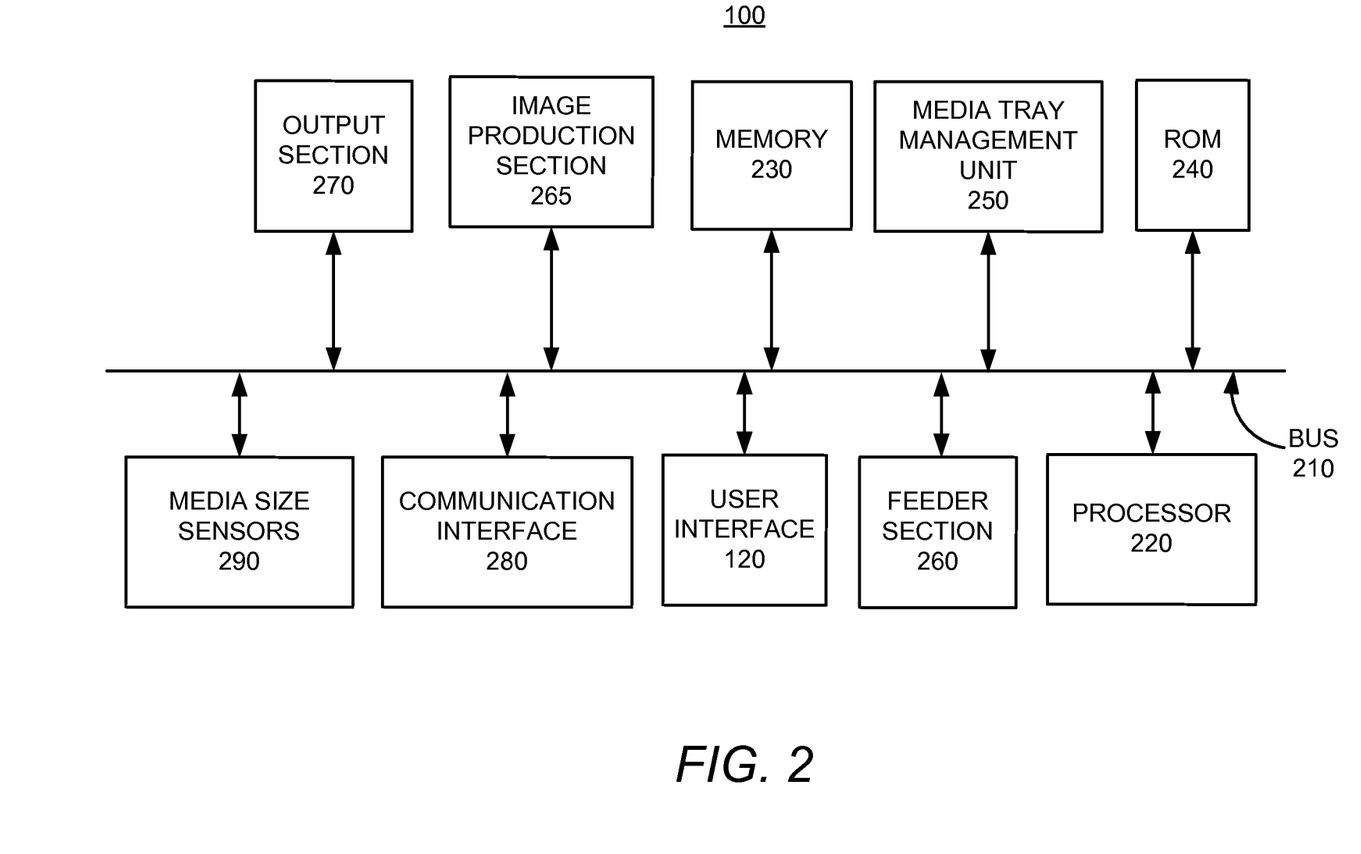
FIG. 2 is an exemplary block diagram of the image production device in accordance with one possible embodiment of the disclosure.

FIG. 2 is an exemplary block diagram of the image production device 100 in accordance with one possible embodiment of the disclosure. The image production device 100 may include a bus 210, a processor 220, a memory 230, a read only memory (ROM) 240, a media tray management unit 250, a feeder section 260, an output section 270, a user interface 120, a communication interface 280, one or more media size sensors 290, and an image production section 265. Bus 210 may permit communication among the components of the image production device 100.

Processor 220 may include at least one conventional processor or microprocessor that interprets and executes instructions. Memory 230 may be a random access memory (RAM) or another type of dynamic storage device that stores information and instructions for execution by processor 220. Memory 230 may also include a read-only memory (ROM) which may include a conventional ROM device or another type of static storage device that stores static information and instructions for processor 220.

Communication interface 280 may include any mechanism that facilitates communication via a network. For example, communication interface 280 may include a modem. Alternatively, communication interface 280 may include other mechanisms for assisting in communications with other devices and/or systems.

ROM 240 may include a conventional ROM device or another type of static storage device that stores static information and instructions for processor 220. A storage device may augment the ROM and may include any type of storage media, such as, for example, magnetic or optical recording media and its corresponding drive.

The image production section 265 may include hardware to produce image on media and may include an image printing and/or copying section, a scanner, a fuser, etc., for example. The feeder section 260 may be stand-alone or integrated and may store and dispense media sheets on which images are to be printed. The output section 270 may include hardware for stacking, folding, stapling, binding, etc., prints which are output from the image production section. If the image production device 100 is also operable as a copier, the image production device 100 may further includes a document feeder and scanner which may operate to convert signals from light reflected from original hard-copy image into digital signals, which are in turn processed to create copies with the image production section 265.

With reference to feeder section 260, the section may include one or more media trays, each of which stores a media stack or print sheets ("media") of a predetermined type (size, weight, color, coating, transparency, etc.) and may include a feeder to dispense one of the media sheets therein as instructed. The one or more media trays 110 may be accessed by a user by opening the one or more media tray doors. The one or more media tray door sensors may sense if one or more media trays 110 are either open or closed. The one or more media tray door sensors may be any sensors known to one of skill in the art, such as contact, infra-red, magnetic, or light-emitting diode (LED) sensors, for example. The one or more media tray size sensors may be any sensors that may detect media size in a media known to one of skill in the art, including switches, etc.

User interface 120 may include one or more conventional mechanisms that permit a user to input information to and interact with the image production unit 100, such as a keyboard, a display, a mouse, a pen, a voice recognition device, touchpad, buttons, etc., for example. Output section 270 may include one or more conventional mechanisms that output image production documents to the user, including output trays, output paths, finishing section, etc., for example. The one or more media size sensors 290 may be any sensors known to one of skill in the art, such as contact, infra-red, magnetic, or light-emitting diode (LED) sensors, for example. The one or more media size sensors 290 may be any sensors that may detect media size in a media tray 110 that are known to one of skill in the art, including switches, etc. and may be the result of sensing user inputs, manufacturer settings, media tray stops, or other known ways of detecting the size of media in media feed trays 110.

The image production device 100 may perform such functions in response to processor 220 by executing sequences of instructions contained in a computer-readable medium, such as, for example, memory 230. Such instructions may be read into memory 230 from another computer-readable medium, such as a storage device or from a separate device via communication interface 280.

The image production device 100 illustrated in FIGS. 1-2 and the related discussion are intended to provide a brief, general description of a suitable communication and processing environment in which the disclosure may be implemented. Although not required, the disclosure will be described, at least in part, in the general context of computer-executable instructions, such as program modules, being executed by the image production device 100, such as a communication server, communications switch, communications router, or general purpose computer, for example.

Generally, program modules include routine programs, objects, components, data structures, etc. that perform particular tasks or implement particular abstract data types. Moreover, those skilled in the art will appreciate that other embodiments of the disclosure may be practiced in communication network environments with many types of communication equipment and computer system configurations, including personal computers, hand-held devices, multi-processor systems, microprocessor-based or programmable consumer electronics, and the like.

Figure 3:
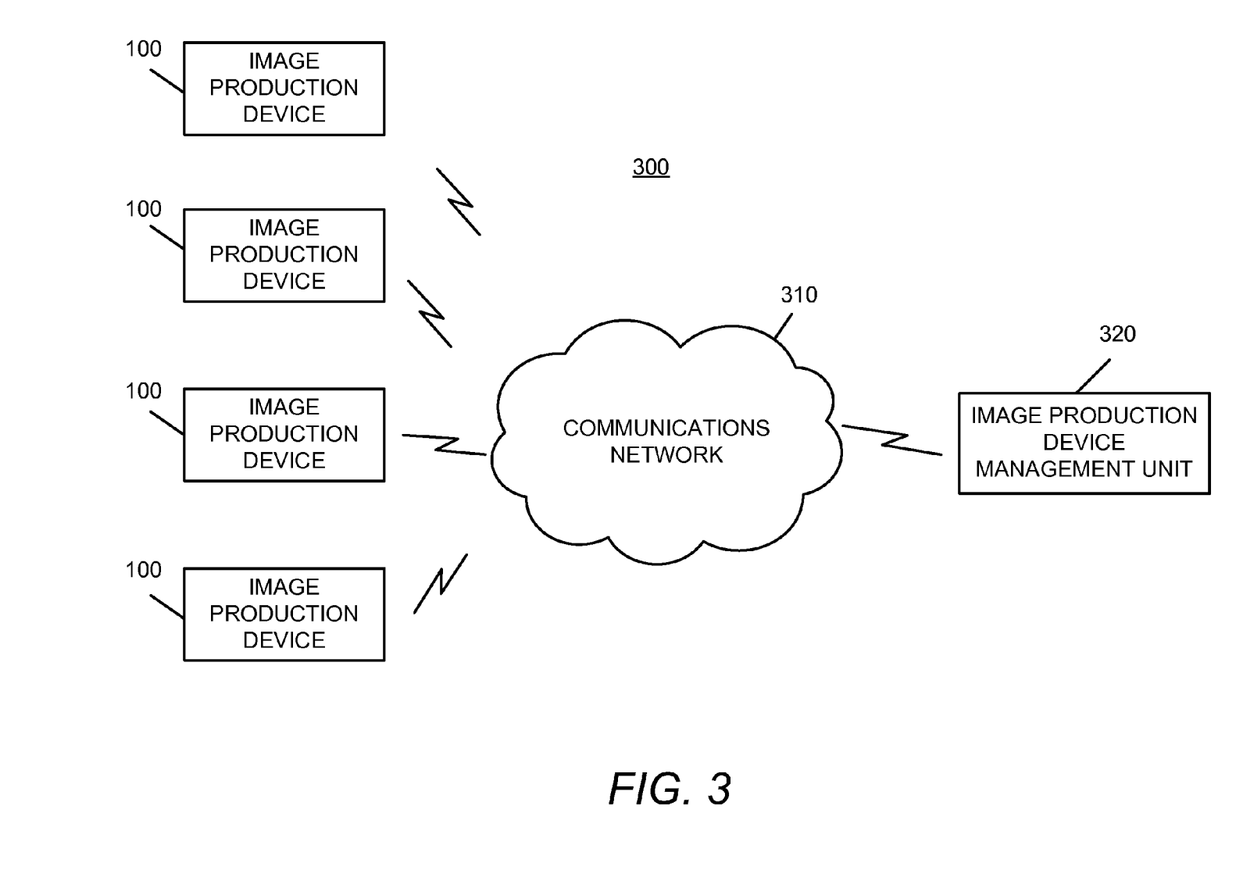
FIG. 3 is an exemplary diagram of the image production device network environment in accordance with one possible embodiment of the disclosure.

FIG. 3 is an exemplary diagram of an image production device network environment 300 in accordance with one possible embodiment of the disclosure. The image production device network environment 300 may include one or more image production devices 100, and an image production device management unit 320 connected through the communications network 310. The image production device management unit 320 may be a server, computer, handheld computer or processing device, for example. The image production device 100 may be a copier, a printer, a facsimile device, or a multi-function device, for example.

The image production device management unit 320 may communicate with image production device 100 via a communication interface over communications network 310. In an embodiment of the present disclosure, the image production devices 100 may manufacturer owned, distributor owned, third party owned, and customer owned, for example.

Figure 4:
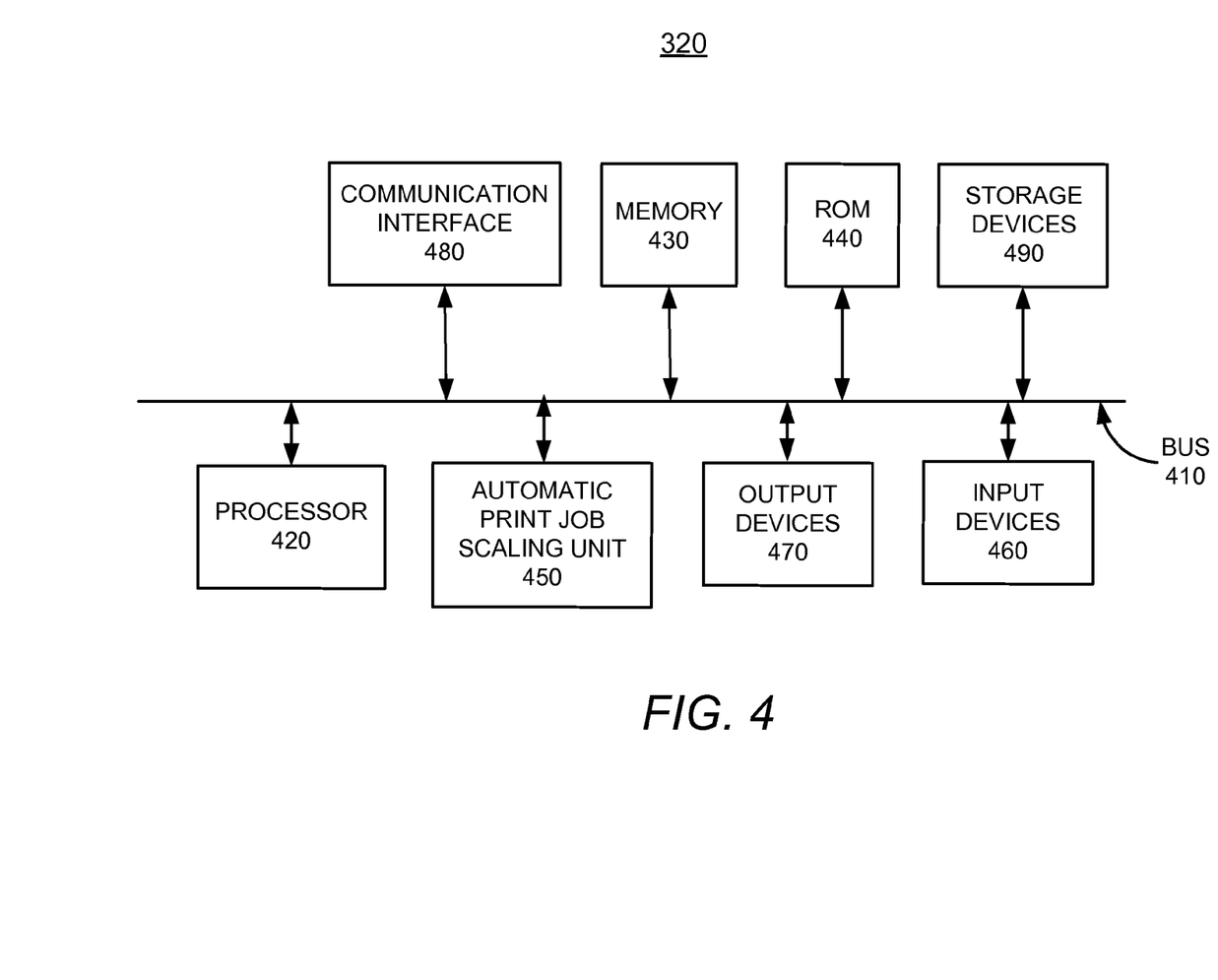
FIG. 4 is an exemplary block diagram of the image production device management unit in accordance with one possible embodiment of the disclosure.

FIG. 4 is an exemplary block diagram of the image production device management unit 320 in accordance with one possible embodiment of the disclosure. The image production device management unit 320 may include a bus 410, a processor 420, a memory 430, a read only memory (ROM) 440, an automatic print job scaling unit 450, input devices 460, output devices 470, a communication interface 480, and storage device 490. Bus 410 may permit communication among the components of the image production device management unit 320.

Processor 420 may include at least one conventional processor or microprocessor that interprets and executes instructions. The memory 430 may be a random access memory (RAM) or another type of dynamic storage device that stores information and instructions for execution by processor 420. The memory 430 may also include a read-only memory (ROM) 440 which may include a conventional ROM device or another type of static storage device that stores static information and instructions for processor 420.

Input devices 460 may include one or more conventional mechanisms that permit a user to input information to the image production device management unit 320, such as a keyboard, a mouse, a pen, a voice recognition device, etc. Output devices 470 may include one or more conventional mechanisms that output information to the user, including a display, a printer, one or more speakers, or a medium, such as a memory, or a magnetic or optical disk and a corresponding disk drive.

Communication interface 480 may include any mechanism that facilitates communication via a network. For example, the communication interface 480 may include a modem. Alternatively, communication interface 480 may include other mechanisms for assisting in communications with other devices and/or systems.

ROM 440 may include a conventional ROM device or another type of static storage device that stores static information and instructions for processor 420. The storage devices 450 may augment the ROM 440 and may include any type of storage media, such as, for example, magnetic or optical recording media and its corresponding drive.

The image production device management unit 320 may perform such functions in response to processor 420 by executing sequences of instructions contained in a computer-readable medium, such as, for example, the memory 430. Such instructions may be read into the memory 430 from another computer-readable medium, such as a storage device or from a separate device via communication interface 480.

The image production device management unit 320 illustrated in FIGS. 3-4 and the related discussion were intended to provide a brief, general description of a suitable communication and processing environment in which the disclosure may be implemented. Although not required, the disclosure will be described, at least in part, in the general context of computer-executable instructions, such as program modules, being executed by the image production device management unit 320, which may be a server, a computer, a handheld computer, and a processing device, for example.

Generally, program modules include routine programs, objects, components, data structures, etc. that perform particular tasks or implement particular abstract data types. Moreover, those skilled in the art will appreciate that other embodiments of the disclosure may be practiced in communication network environments with many types of communication equipment and computer system configurations, including personal computers, hand-held devices, multi-processor systems, microprocessor-based or programmable consumer electronics, and the like.

The operation of the automatic print job adjustment unit 450 and the automatic print job scaling process will be discussed below in relation to the flowchart in FIG. 5.

Figure 5:
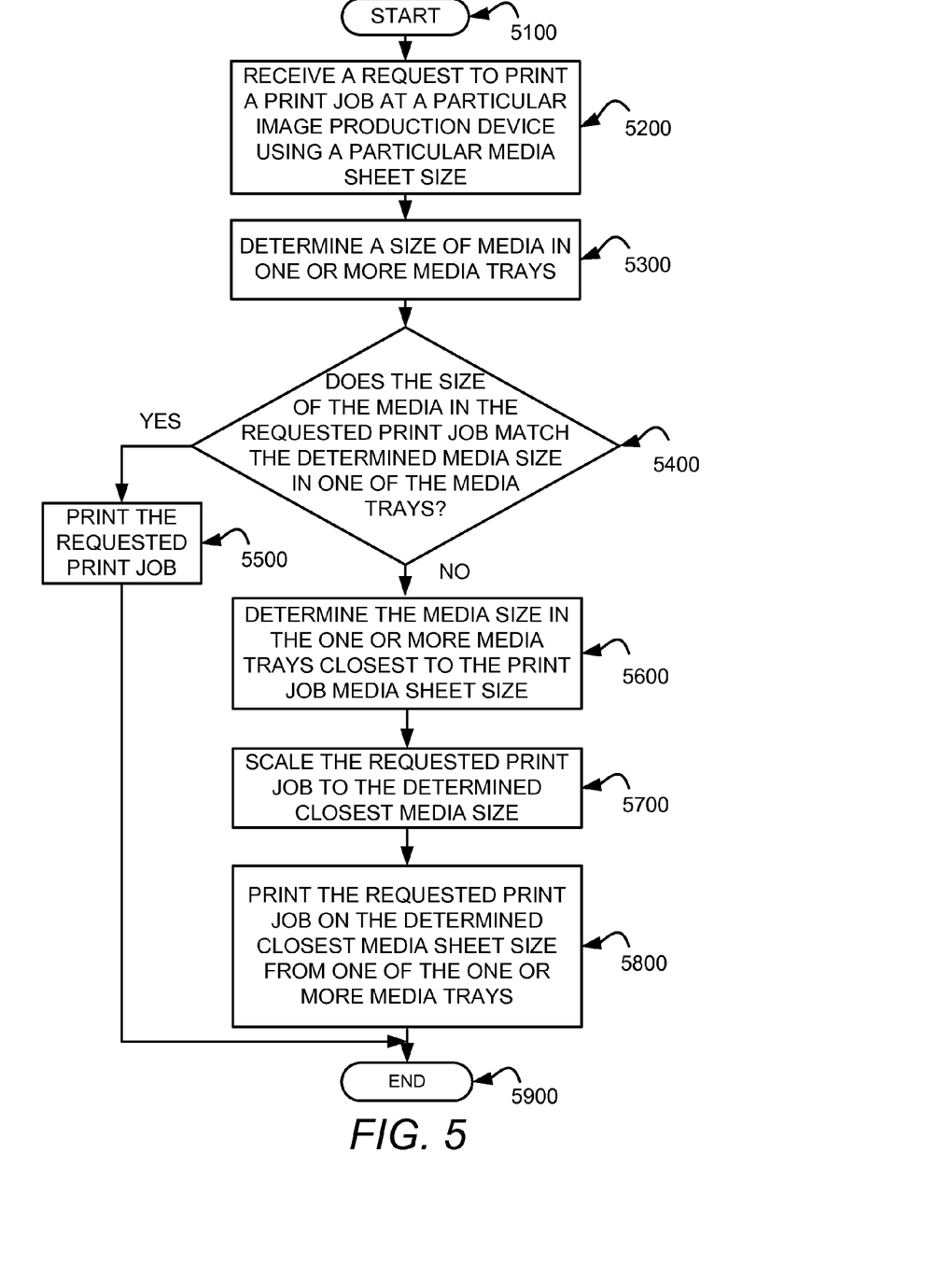
FIG. 5 is a flowchart of an exemplary automatic print jobs scaling process in accordance with one possible embodiment of the disclosure.

FIG. 5 is a flowchart of automatic print job scaling process in accordance with one possible embodiment of the disclosure. The process may begin at step 5100 and may continue to step 5200 where the automatic print job scaling unit 450 may receive a request to print a print job at a particular image production device 100 using a particular media sheet size. At step 5300, the automatic print job scaling unit 450 may determine a size of media in the one or more media trays 110 in the particular image production device 100.

At step 5400, the automatic print job scaling unit 450 may determine if the size of the media in the requested print job matches the determined media size in one of the one or more media trays 110. If the automatic print job scaling unit 450 determines that the size of the media in the requested print job matches the determined media size in one of the one or more media trays, the process goes to step 5500 where the automatic print job scaling unit 450 may print the requested print job on the particular media sheet size from one of the one or more media trays 110.

If at step 5400, the automatic print job scaling unit 450 determines that the size of the media in the requested print job does not match the determined media size in one of the one or more media trays, the process may go to step 5600 where the automatic print job scaling unit 450 may determine the media size in the one or more media trays 110 closest to the print job media sheet size. In determining the media size in the one or more media trays 110 closest to the print job media sheet size, the automatic print job scaling unit 450 may determine whether at least one of a larger media size in the one or more media trays 110 and a smaller media size in the one or more media trays 110, is closest to the print job media sheet size. This process may be performed in any order, for example. In addition, the user or the automatic print job scaling unit 450 may have a preference for choosing a larger or smaller size media over the other in determining the closest media size, for example.

At step 5700, the automatic print job scaling unit 450 may scale the requested print job to the determined closest media size. For example, a legal sized print job request may be scaled to letter-size or A4-size media, if no legal size media is in the one or more media trays 110 and either or both letter or A4 are in the one or more media trays 110. At step 5800, the automatic print job scaling unit 450 may print the requested print job on the determined closest media sheet size from one of the one or more media trays using the image production section 265. The process may then go to step 5900 and end.

The automatic print job scaling unit 450 may determine if the determined media size in the one or more media trays 110 closest to the print job media sheet size is within a predetermined scaling range. If the automatic print job scaling unit 450 determines that the media size in the one or more media trays closest to the print job media sheet size is within a predetermined scaling range, the automatic print job scaling unit may scale the requested print job to the determined closest media size. If the automatic print job scaling unit 450 determines that the media size in the one or more media trays closest to the print job media sheet size is not within a predetermined scaling range, the automatic print job scaling unit 450 may print the requested print job on the particular media sheet size from one of the one or more media trays 110. The predetermined scaling range may be determined by one of a user, the automatic print job scaling unit 450, a system administrator, or the manufacturer, for example.

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for automatically scaling print jobs without any user inputs in an image production device network, comprising:
   receiving a request to print a print job at a particular image production device using a particular media sheet size;
   determining a size of media in one or more media trays in the particular image production device;
   determining if the size of the media in the requested print job matches the determined media size in one of the one or more media trays, wherein when it is determined that the size of the media in the requested print job does not match the determined media size in one of the one or more media trays,
   determining if the determined media size in the one or more media trays closest to the print job media sheet size is within a predetermined scaling range, wherein when it is determined that the media size in the one or more media trays closest to the print job media sheet size is within the predetermined scaling range,
   scaling the requested print job to the determined closest media size; and
   printing the requested print job on the determined closest media sheet size from one of the one or more media trays;
   wherein the predetermined scaling range is determined by one of a system administrator or the manufacturer.

2. The method of claim 1, wherein if it is determined that the size of the media in the requested print job matches the determined media size in one of the one or more media trays,
printing the requested print job on the particular media sheet size from one of the one or more media trays.

3. The method of claim 1, wherein in determining the media size in the one or more media trays closest to the print job media sheet size,
determining whether at least one of a larger media size in the one or more media trays and a smaller media size in the one or more media trays, is closest to the print job media sheet size.

4. The method of claim 1, wherein the particular image production device is one of a copier, a printer, a facsimile device, and a multi-function device.

5. An image production device management unit for automatically scaling print jobs in an image production device network without any user inputs, the image production device management unit controlling one or more image production devices, each of the image production devices having one or more media trays each containing media sheets of a particular size and an image production section that prints requested print jobs, the image production device management unit comprising:
an automatic print job scaling unit that receives a request to print a print job at a particular image production device of the image production devices using a particular media sheet size, determines a size of media in the one or more media trays in the particular image production device, determines if the size of the media in the requested print job matches the determined media size in one of the one or more media trays, wherein when the automatic print job scaling unit determines that the size of the media in the requested print job does not match the determined media size in one of the one or more media trays, the automatic print job scaling unit determines the media size in the one or more media trays closest to the print job media sheet size, wherein the automatic print job scaling unit determines if the determined media size in the one or more media trays closest to the print job media sheet size is within a predetermined scaling range, wherein when the automatic print job scaling unit determines that the media size in the one or more media trays closest to the print job media sheet size is within the predetermined scaling range, the automatic print job scaling unit scales the requested print job to the determined closest media size, and prims the requested print job on the determined closest media sheet size from one of the one or more media trays using the image production section;
wherein the predetermined scaling range is determined by one of a system administrator or the manufacturer.

6. The image production device management unit in an image production device network for automatically scaling print jobs without any user inputs of claim 5, wherein when the automatic print job scaling unit determines that the size of the media in the requested print job matches the determined media size in one of the one or more media trays, the automatic print job scaling unit prints the requested print job on the particular media sheet size from one of the one or more media trays.

7. The image production device management unit in an image production device network for automatically scaling print jobs without any user inputs of claim 5, wherein in determining the media size in the one or more media trays closest to the print job media sheet size, the automatic print job scaling unit determines whether at least one of a larger media size in the one or more media trays and a smaller media size in the one or more media trays, is closest to the print job media sheet size.

8. The image production device management unit in an image production device network for automatically scaling print jobs without any user inputs of claim 5, wherein the particular image production device is one of a copier, a printer, a facsimile device, and a multi-function device.

9. A non-transient computer-readable medium storing instructions for controlling a computing device for automatically scaling print jobs without any user inputs in an image production device network, the instructions comprising:
receiving a request to print a print job at a particular image production device using a particular media sheet size;
determining a size of media in one or more media trays in the particular image production device;
determining if the size of the media in the requested print job matches the determined media size in one of the one or more media trays, wherein when it is determined that the size of the media in the requested print job does not match the determined media size in one of the one or more media trays,
determining if the determined media size in the one or more media trays closest to the print job media sheet size is within a predetermined scaling range, wherein when it is determined that the media size in the one or more media trays closest to the print job media sheet size is within the predetermined scaling range,
scaling the requested print job to the determined closest media size; and
priming the requested print job on the determined closest media sheet size from one of the one or more media trays;
wherein the predetermined scaling range is determined by one of a system administrator or the manufacturer.

10. The non-transient computer-readable medium of claim 9, wherein when it is determined that the size of the media in the requested print job matches the determined media size in one of the one or more media trays,
printing the requested print job on the particular media sheet size from one of the one or more media trays.

11. The non-transient computer-readable medium of claim 9, wherein in determining the media size in the one or more media trays closest to the print job media sheet size,
determining whether at least one of a larger media size in the one or more media trays and a smaller media size in the one or more media trays, is closest to the print job media sheet size.

12. The non-transient computer-readable medium of claim 9, wherein the particular image production device is one of a copier, a printer, a facsimile device, and a multi-function device.

* * * * *